(12) United States Patent
Mesch

(10) Patent No.: US 8,517,207 B2
(45) Date of Patent: Aug. 27, 2013

(54) REUSABLE PACKAGING AND SHIPPING SYSTEM

(76) Inventor: Randy Mesch, Surprise, AZ (US)

( * ) Notice: Subject to any disclaimer, the term of this patent is extended or adjusted under 35 U.S.C. 154(b) by 238 days.

(21) Appl. No.: 13/006,362

(22) Filed: Jan. 13, 2011

(65) Prior Publication Data

US 2011/0174810 A1    Jul. 21, 2011

Related U.S. Application Data

(60) Provisional application No. 61/295,552, filed on Jan. 15, 2010.

(51) Int. Cl.
  *B65D 1/42*  (2006.01)
  *B65D 6/34*  (2006.01)
  *B65D 8/08*  (2006.01)

(52) U.S. Cl.
  USPC ......................... 220/647; 220/4.28; 220/4.33

(58) Field of Classification Search
  USPC ............... 220/4.28, 4.33, 6, 647; 53/443, 53/457, 458; 206/451, 452
  See application file for complete search history.

(56) References Cited

U.S. PATENT DOCUMENTS

| | | | | |
|---|---|---|---|---|
| 1,910,783 A | * | 5/1933 | Way | 206/451 |
| 3,138,398 A | * | 6/1964 | Silverman | 294/68.1 |
| 4,120,417 A | | 10/1978 | Aquino | |
| 7,607,542 B1 | | 10/2009 | Hsieh | |
| 2004/0232145 A1 | * | 11/2004 | Antal et al. | 220/4.33 |
| 2009/0199514 A1 | | 8/2009 | Goodrich | |

* cited by examiner

*Primary Examiner* — Harry Grosso

(57) ABSTRACT

A reusable packaging device for protecting an object during shipment may include at least four end caps and strap assemblies configured to selectively hold the end caps in a desired expanded position relative to one another during shipment of the object and to hold the end caps in contact with one another after the object has been received. In one embodiment the object may be clamped between two of the packaging devices for shipment.

6 Claims, 3 Drawing Sheets

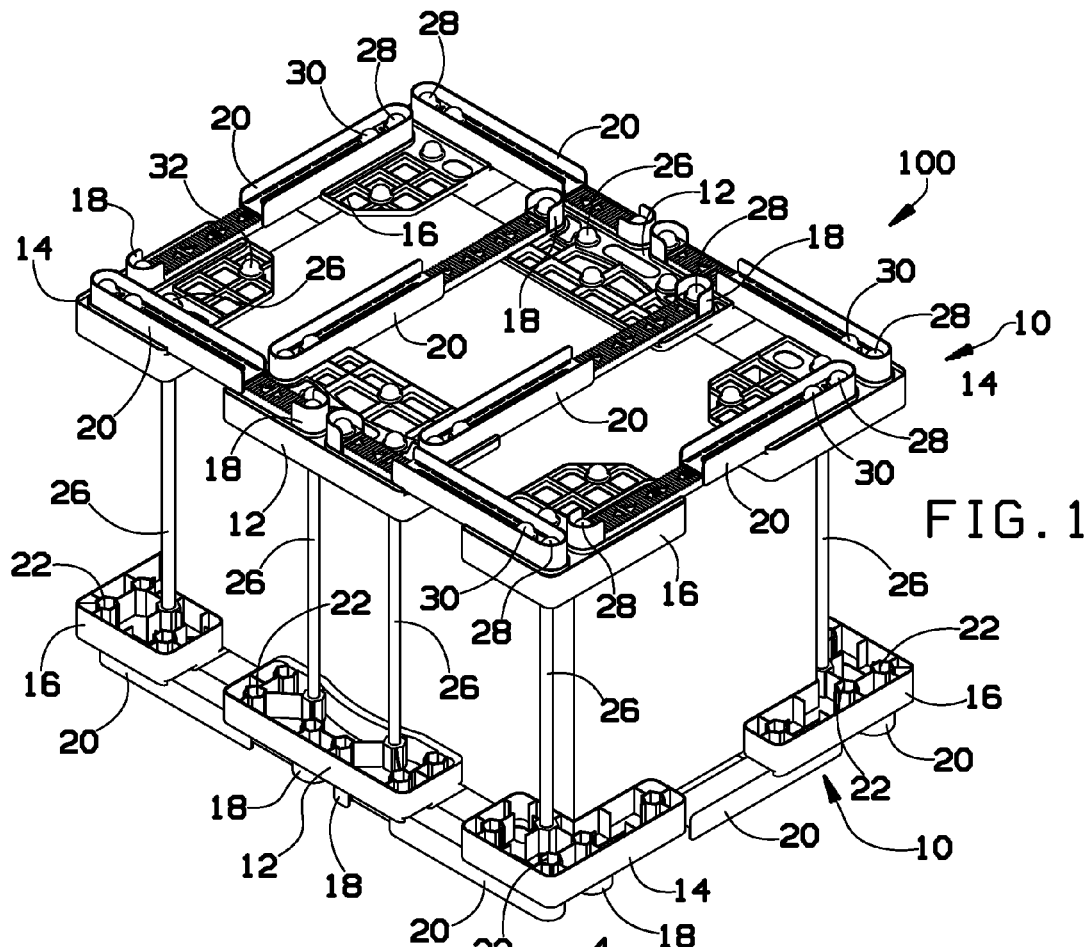
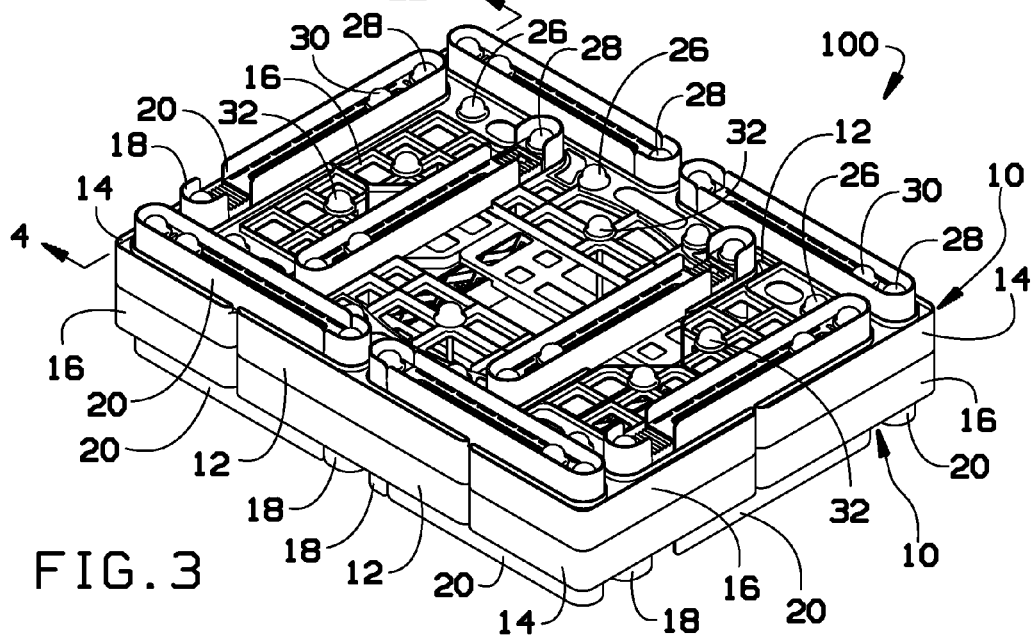

US 8,517,207 B2

REUSABLE PACKAGING AND SHIPPING SYSTEM

RELATED APPLICATIONS

This application claims the benefit of U.S. Provisional Patent Application No. 61/295,552 filed Jan. 17, 2010.

BACKGROUND OF THE INVENTION

The present invention generally relates to packaging and shipping systems. More particularly, the invention relates to such systems in which packaging devices may be re-used for successive shipments of materials.

Many articles must be protected from damage as they are transported from one location to another. Typically, protection is provided with packaging materials that are constructed and shaped particularly for the article to be transported. For example, an object such a particular model of television set may be transported in a box that is specifically designed for that model. Specially shaped inserts may be added to the box to protect the television set from damage that may result from sudden movement of the box during transport. Some objects such as metal, glass or stone panels may be shipped on wooden pallets or crates which may be uniquely configured for a particular size of the panel. These uniquely shaped packaging materials are discarded after the transported object reaches its destination.

As can be seen, there is a need for a packaging and shipping system in which a wide variety of items may shipped without a need to construct a correspondingly wide variety of specially shaped packaging devices. Additionally, there is a need for such a system in which packaging devices may be re-used for subsequent shipping activity and not discarded after a single use.

SUMMARY OF THE INVENTION

In one aspect of the present invention, A reusable packaging device for protecting an object during shipment may comprise: at least four end caps; and strap assemblies configured to selectively hold the end caps in a desired expanded position relative to one another during shipment of the object and to hold the end caps in contact with one another after the object has been received.

In another aspect of the present invention, a reusable container for shipping an object may comprise: first and second packaging devices, each of the packaging devices comprising: at least four end caps; and strap assemblies configured to selectively hold the end caps in a desired expanded position relative to one another during shipment of the object and to hold the end caps in contact with one another after the object has been received, wherein the first and second packaging devices are configured to be clamped against first and second sides of the object with clamping bolts.

In still another aspect of the invention, a method for packaging and shipping an object comprising the steps of: configuring first and a second reusable packaging devices into planar configurations larger than the object; placing the object between the first and second packaging devices; clamping the first and second packaging devices against the object with clamping bolts that interconnect the first and second packaging devices; shipping the object and the packaging devices; removing the object from the packaging devices; re-configuring the first and second packaging device to a minimal planar size; clamping the first and second packaging devices to one another with the clamping bolts; and storing or returning the clamped packaging devices for subsequent re-use.

These and other features, aspects and advantages of the present invention will become better understood with reference to the following drawings, description and claims.

BRIEF DESCRIPTION OF THE DRAWINGS

FIG. 1 is a perspective view of a reusable container holding a first object in accordance with an embodiment of the invention;

FIG. 3 is a perspective view of the reusable container of FIG. 1 in a collapsed state in accordance with an embodiment of the invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Various inventive features are described below that can each be used independently of one another or in combination with other features.

Broadly, embodiments of the present invention generally provide a packaging and shipping system in which universal packaging devices may be used to package a wide variety of items to be shipped and in which the packaging devices may be re-used for subsequent shipping activity and not discarded after a single use.

Figure 2:
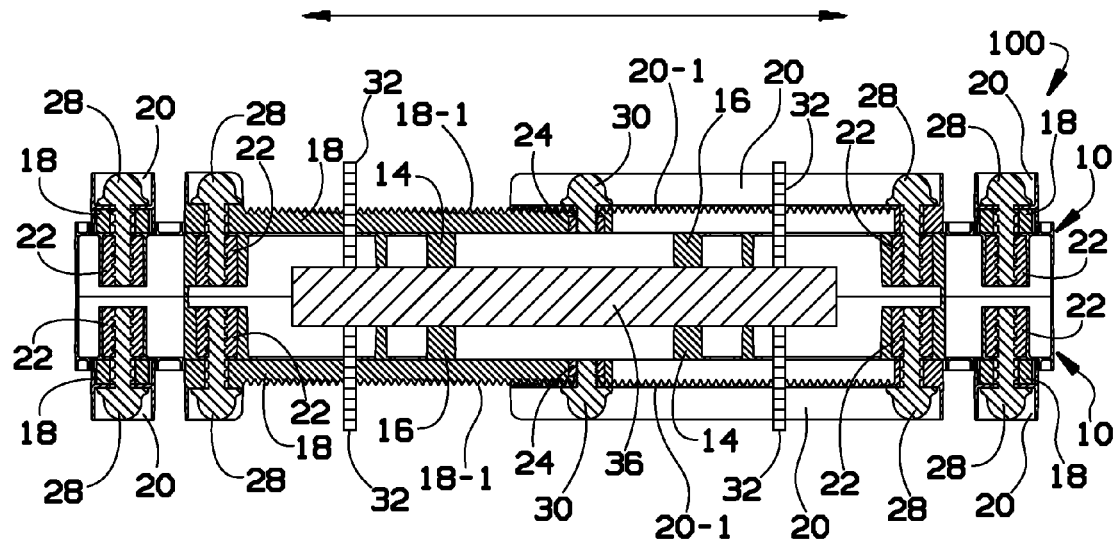
FIG. 2 is a sectional view of the reusable container of FIG. 1 holding a second object in accordance with an embodiment of the invention.

Referring now to FIGS. 1 and 2, two packaging devices 10 are shown supporting objects 34 and 36 to be shipped. Collectively, the two packaging devices may be considered to be a reusable container 100. Each of the packaging devices 10 may comprise mid caps 12; left end caps 14; right end caps 16; bottom cross members or straps 18; top cross members or straps 20; double lead nuts 22; cross member nuts 24; clamping screws 26; double lead screws 28; cross member screws 30 and gap screws 32. In an exemplary embodiment, the end caps 14 and 16, the mid caps 12 and the straps 18 and 20 may be constructed from recyclable plastic. The end caps 14 and 16 may be adjustably positioned relative to one another and relative to the mid cap 12. The strap members 18 may be employed to hold the end caps 14 in a desired position relative to one another and relative to the mid caps 12. An upper one of devices 10 may be secured to a lower one of the devices 10 with the clamping screws 26.

In FIG. 1, it may be seen that the object 34 may be securely held between the upper and lower packaging devices 10. In FIG. 2, the object 36 may be held in position with the gap screws 32. The packaging devices 10 may expanded to a planar size larger than that of the object to be shipped and may therefore provide a protective frame around the objects 34 or 36. The end caps 14 and 16 may be positioned to accommodate a wide range of sizes and shapes of the shipped objects 34 or 36. More than one of the objects 34 or 36 may be shipped within one of the reusable containers 100.

The bottom straps 18 and top straps 20 may be provided with toothed-surface areas 18-1 and 20-1 which may be engageable with each other. In that regard, one of the top straps 20 and one of the bottom straps 18 may be considered to be a strap assembly. The end caps 14 and 16 may be provided with the threaded holes double lead nuts 22 and the cross member nuts 24 into which the double lead screws 28 and the cross member screws 30 may be inserted and tightened against the strap members 18 and 20 to hold them in position. The top strap members 20 may be provided with slots 20-2 so that the cross member screws 30 may be tightened against the strap members 20 at any point along their length.

Figure 4:
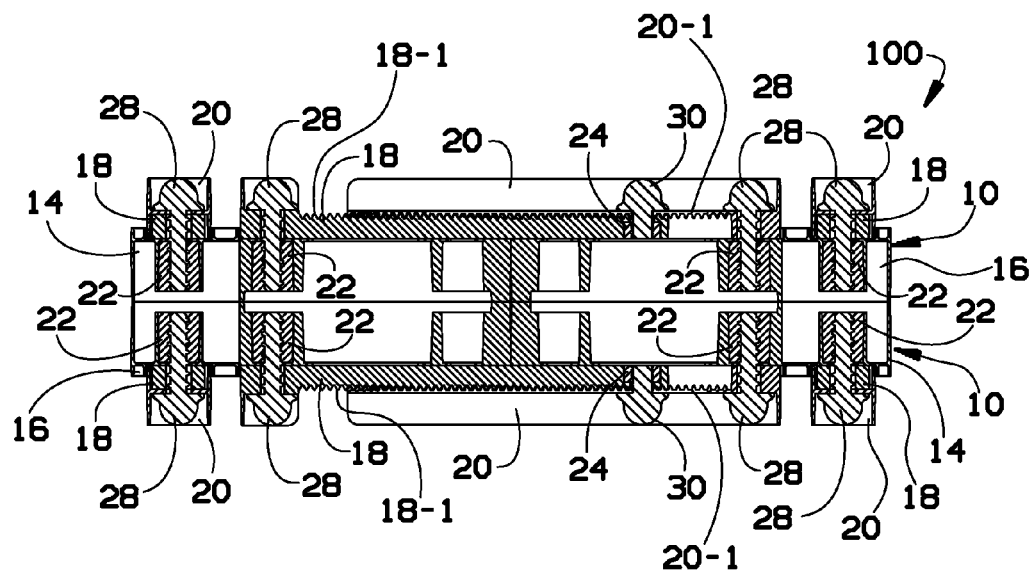
FIG. 4 is a sectional view, taken along the lines 4-4, of the reusable container in accordance with an embodiment of the invention.
Figure 5:
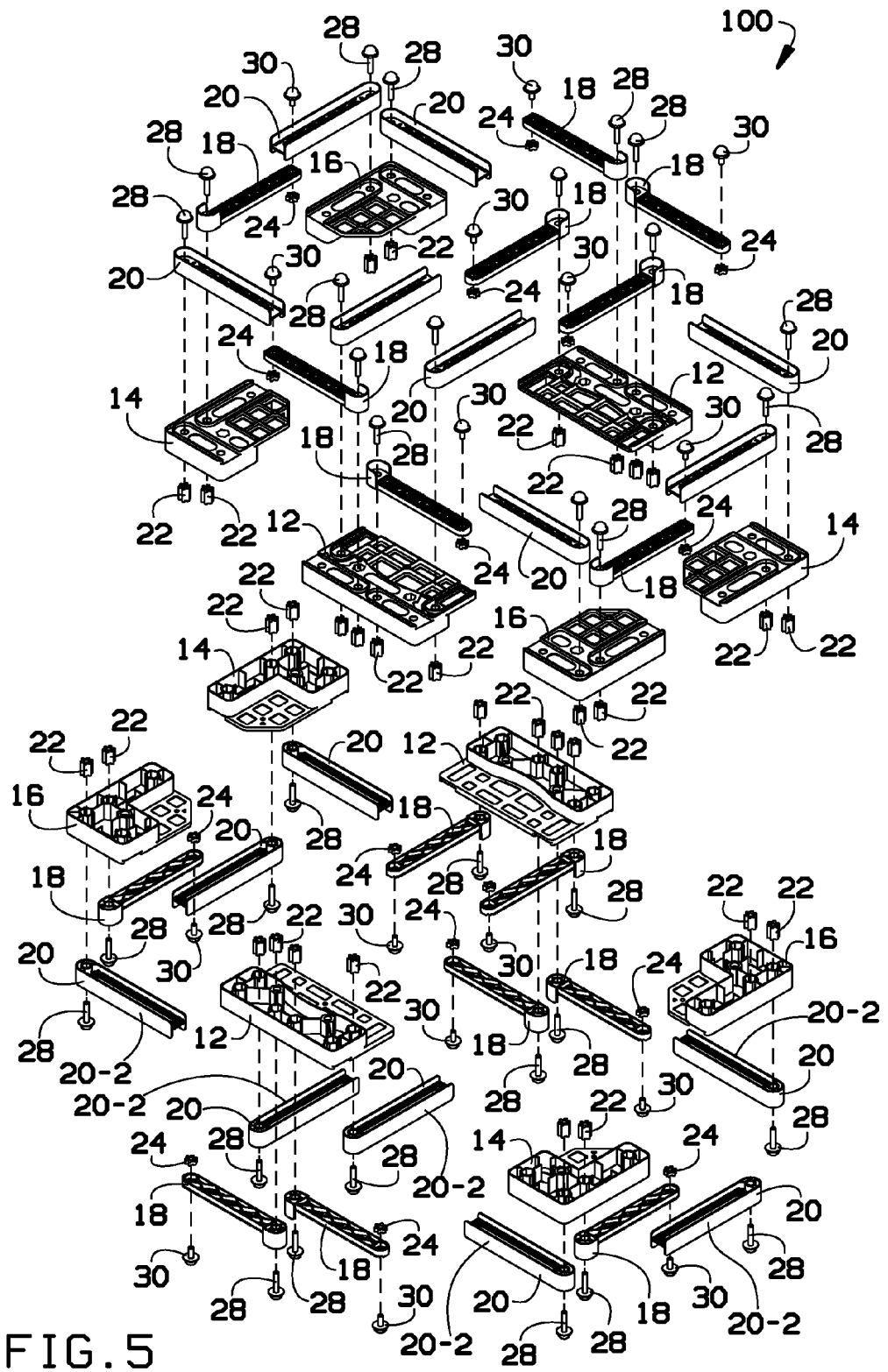
FIG. 5 is an exploded view of various elements of the reusable container of FIG. 1 in accordance with an embodiment of the invention.

Referring now to FIGS. 3 and 4, the packaging devices 10 are shown in a collapsed state as they might be configured by a receiving party for storage or for return to a sending party. After the shipped object 34 or 36 of FIGS. 1 and 2 has been removed, the end caps 14 and 16 may be moved together against one another and against the mid caps 12. The end caps 14 and 16 may be held in this collapsed state with the straps 18 and 20. Two of the packing devices 10 may be held together as a set with the clamping screws 26.

After the packaging devices 10 are used to protect one or more of the objects 34 or 36 during shipment, the devices 10 may be collapsed into a convenient size (i.e., a minimal planar size) and then returned to the sender. Alternatively, the devices 10 may be used by the receiver to ship other objects to a second receiver. The receiver may configure the device 10 to accommodate an object having a different size and shape than that of the objects 34 or 36.

It should be understood, of course, that the foregoing relates to exemplary embodiments of the invention and that modifications may be made without departing from the spirit and scope of the invention as set forth in the following claims.

I claim:

1. A reusable packaging device for protecting an object during shipment comprising:
at least four end caps; and
strap assemblies configured of two pieces top and bottom each with a toothed surface to interlock, secure, strengthen and adjust for sizing to selectively hold the end caps in a desired expanded position relative to one another during shipment of the object and to hold the end caps in contact with one another after the object has been received.

2. The packaging device of claim 1 further comprising:
a mid cap positioned between two of the end caps,
wherein two or more of the strap assemblies hold the end caps in a desired position relative to mid cap.

3. The packaging devices of claim 1:
wherein the end caps are provided with threaded nuts;
wherein the top straps have slotted holes;
wherein bolts pass through the slotted holes and into the threaded nuts so that selected portions of the toothed-surface areas of the top straps and bottom straps are held in engagement with each other.

4. The packaging device of claim 1 wherein the end caps and the strap members comprise recyclable plastic.

5. A reusable container for shipping an object comprising:
first and second packaging devices, each of the packaging devices comprising:
at least four end caps; and
strap assemblies configured of two pieces top and bottom each with a toothed surface to interlock, secure, strengthen and adjust for sizing to selectively hold the end caps in a desired expanded position relative to one another during shipment of the object and to hold the end caps in contact with one another after the object has been received,
wherein the first and second packaging devices are configured to be clamped against first and second sides of the object with clamping bolts.

6. The reusable container of claim 5:
wherein the packaging devices further comprise a mid cap positioned between two of the end caps,
wherein two of the strap assemblies hold the end caps in a desired position relative to mid cap,
wherein top straps and bottom straps (2) each having toothed-surface areas to interlock;
wherein the end caps are provided with threaded nuts;
wherein the top straps have slotted holes;
wherein bolts pass through the slotted holes and into the threaded nuts so that selected portions of the toothed-surface areas of the top straps and bottom straps are held in engagement with each other.

* * * * *